United States Patent
Hu et al.

(10) Patent No.: US 10,362,058 B2
(45) Date of Patent: Jul. 23, 2019

(54) SECURE AND SCALABLE DATA TRANSFER USING A HYBRID BLOCKCHAIN-BASED APPROACH

(71) Applicant: VMware, Inc., Palo Alto, CA (US)

(72) Inventors: Chaoxin Hu, Beijing (CN); Kecheng Lu, Beijing (CN)

(73) Assignee: VMWARE, INC, Palo Alto, CA (US)

( * ) Notice: Subject to any disclaimer, the term of this patent is extended or adjusted under 35 U.S.C. 154(b) by 189 days.

(21) Appl. No.: 15/154,555

(22) Filed: May 13, 2016

(65) Prior Publication Data

US 2017/0329980 A1   Nov. 16, 2017

(51) Int. Cl.
| | |
|---|---|
| *H04L 29/06* | (2006.01) |
| *G06F 21/60* | (2013.01) |
| *G06F 21/78* | (2013.01) |
| *H04L 29/08* | (2006.01) |

(52) U.S. Cl.
CPC ............ *H04L 63/18* (2013.01); *G06F 21/606* (2013.01); *G06F 21/78* (2013.01); *H04L 63/04* (2013.01); *H04L 63/062* (2013.01); *H04L 63/0876* (2013.01); *H04L 63/0823* (2013.01); *H04L 67/1097* (2013.01); *H04L 2463/062* (2013.01)

(58) Field of Classification Search
CPC .............................. H04L 63/04; H04L 63/18
See application file for complete search history.

(56) References Cited

U.S. PATENT DOCUMENTS

| | | | |
|---|---|---|---|
| 8,140,647 B1 * | 3/2012 | Juillard | H04L 67/2842 709/203 |
| 9,794,074 B2 * | 10/2017 | Toll | G06Q 40/04 |
| 10,230,756 B2 * | 3/2019 | Androulaki | H04L 63/1441 |

(Continued)

FOREIGN PATENT DOCUMENTS

WO          2017178955          † 10/2017

OTHER PUBLICATIONS

Watanabe, Hiroki; Fujimura, Shigeru; Nakadaira, Atsushi; Miyazaki, Yasuhiko; Akutsu, Akihito; Kishigami, Jay; "Blockchain Contract: Securing a Blockchain Applied to Smart Contracts", International Conference on Consumer Electronics (ICCE), IEEE, Jan. 7-11, 2016, pp. 467-468.*

Kishigami, Jay; Fujimura, Shigeru; Watanabe, Hiroki; Nakadaira, Atsushi; Akutsu, Akihiko; "The Blockchain-based Digital Content Distribution System", Fifth International Conference on Big Data and Cloud Computing, IEEE, Aug. 26-28, 2015, pp. 187-190.*

(Continued)

*Primary Examiner* — Victor Lesniewski (57) ABSTRACT

Techniques for facilitating secure and scalable data transfers using a hybrid blockchain-based approach are provided. In one embodiment, a first computer system at a first site can transmit a token to a second computer system at a second site, where the token includes metadata regarding a data set to be transferred from the first computer system to the second computer system and one or more cloud storage service addresses where the data set will be temporarily stored. The token can be transmitted using a blockchain network that is accessible to the first and second computer systems via a public network. The first computer system can then upload the data set to the one or more cloud storage service addresses via the public network, and the second computer system can download the data set from the one or more cloud storage service addresses via the public network.

21 Claims, 6 Drawing Sheets

(56) References Cited

U.S. PATENT DOCUMENTS

| | | | | |
|---|---|---|---|---|
| 2008/0289006 | A1* | 11/2008 | Hock | H04L 63/08 |
| | | | | 726/4 |
| 2010/0332401 | A1* | 12/2010 | Prahlad | G06F 17/30082 |
| | | | | 705/80 |
| 2012/0079323 | A1* | 3/2012 | Chincisan | H04L 1/1642 |
| | | | | 714/18 |
| 2012/0233293 | A1* | 9/2012 | Barton | H04L 67/06 |
| | | | | 709/219 |
| 2013/0110778 | A1† | 5/2013 | Taylor et al. | |
| 2013/0305039 | A1* | 11/2013 | Gauda | G06F 21/6218 |
| | | | | 713/153 |
| 2015/0149530 | A1† | 5/2015 | Maret et al. | |
| 2015/0332283 | A1* | 11/2015 | Witchey | G06Q 30/018 |
| | | | | 705/3 |
| 2017/0017936 | A1* | 1/2017 | Bisikalo | G06Q 20/065 |
| 2017/0017954 | A1* | 1/2017 | McDonough | G06Q 20/36 |
| 2017/0017955 | A1* | 1/2017 | Stern | G06Q 20/36 |
| 2017/0039330 | A1* | 2/2017 | Tanner, Jr. | G06F 19/328 |
| 2017/0046698 | A1* | 2/2017 | Haldenby | G06Q 20/0655 |
| 2017/0132626 | A1* | 5/2017 | Kennedy | G06Q 20/065 |
| 2017/0134161 | A1* | 5/2017 | Goeringer | H04L 9/0637 |
| 2017/0155515 | A1* | 6/2017 | Androulaki | G06F 21/64 |
| 2017/0177855 | A1* | 6/2017 | Costa Faidella | G06F 21/45 |
| 2017/0230189 | A1* | 8/2017 | Toll | G06Q 40/04 |
| 2017/0243193 | A1* | 8/2017 | Manian | G06Q 20/3829 |
| 2017/0279774 | A1* | 9/2017 | Booz | H04L 67/34 |
| 2017/0289111 | A1* | 10/2017 | Voell | H04L 9/3236 |
| 2017/0300627 | A1* | 10/2017 | Giordano | G06F 19/322 |
| 2017/0330174 | A1* | 11/2017 | Demarinis | G06Q 20/3829 |
| 2017/0331810 | A1* | 11/2017 | Kurian | H04L 63/083 |

OTHER PUBLICATIONS

Wes Chou, "Optimizing the WAN between Branch Offices and the Data Center", IT Professional Magazine, vol. 11.4, pp. 24-27, Jul. 2009.

A. Kambourakis et al, "Advanced SSL/TLS-based Authentication for Secure WLAN-3G Interworking", IEEE Proceedings—Communications, vol. 151, Issue 5, pp. 501-506, Oct. 2004.

Mary K. Thompson et al, "Certificate-based Authorization Policy in a PKI Environment", ACM TISSEC 2003, vol. 6, 26 pages, Nov. 2003.

Marten Van Dijk et al, "Fully Homomorphic Encryption over the Integers", EUROCRYPT 2010, 28 pages, Jun. 8, 2010.

Kolja Eger et al, "Bandwidth Trading in BitTorrent-like P2P Networks for Content Distribution," Computer Communications, vol. 31, pp. 201-211, Feb. 2008.

Ang Li et al, "CloudCmp: Comparing Public Cloud Providers," ACM IMC 2010, pp. 1-14, Nov. 2010.

Cong Wang et al, "Privacy-Preserving Public Auditing for Data Storage Security in Cloud Computing," IEEE Infocom 2010, pp. 1-9, Mar. 2010.

Nakamoto Satoshi, "Bitcoin: A Peer-to-Peer Electronic Cash System", 9 pages, Nov. 2008.

Litecoin—Open source P2P digital currency, www.litecoin.org, retrieved May 12, 2016.

"Domestic Private Line Services Pricing", www.business.att.com, retrieved May 12, 2016.

"China Unicomm IPLC Private Line Pricing", www.001kd.com,retrieved May 12, 2016.

\* cited by examiner
† cited by third party

SECURE AND SCALABLE DATA TRANSFER USING A HYBRID BLOCKCHAIN-BASED APPROACH

BACKGROUND

In recent years, the need for performing large data transfers between sites in corporate cloud environments such as remote office/branch office (ROBO) environments has grown significantly due to various emerging technologies and business requirements. Examples of these technologies/business requirements include cross-site disaster recovery via virtual machine (VM) replication, cross-site VM migration, unified data management, and others.

One method for securely supporting large data transfers in a cloud environment is to establish a private line (i.e., a dedicated, point-to-point network connection) between the sender and receiver sites. Unfortunately, private lines can be extremely costly to lease or install and may not be available in all geographic locations.

The preferable option from a cost standpoint is to utilize the public network(s) interconnecting the sender and receiver sites for such transfers. The challenges with this option are (1) ensuring the security of the data being transmitted, and (2) maintaining high data throughput and scalability to support very large transfer volumes. There are a number of existing network security mechanisms, like Public Key Infrastructure (PKI)-based authentication and the Secure Sockets Layer (SSL)/Transport Layer Security (TLS) protocols, which can be used to increase the security of data transfers over public networks. But, while these mechanisms are continually being hardened and improved, the use of a public network as the underlying data transport means that the sender and receiver entities cannot control all of the nodes in the data transmission path by design. As a result, these mechanisms may be still be vulnerable to eavesdropping, masquerade, and other types of network attacks.

It is also possible to implement newer homomorphic end-to-end encryption schemes that ostensibly provide greater security guarantees. However, these schemes generally cannot scale to support the large data transfers needed in corporate clouds due to relatively poor throughput performance and high computational cost.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure provide techniques that leverage a blockchain network and one or more cloud storage services to enable large data transfers over a public network in a secure, scalable, and cost efficient manner. These techniques (collectively referred to herein as "hybrid blockchain-based data transfer," or HBDT) are particularly useful for corporate cloud/ROBO environments, although they are equally applicable to any cloud environment in which there is a need to perform bulk transfers of data between senders and receivers that are communicatively coupled via a public network infrastructure.

As known in the art, a "blockchain network" is a type of computer network that implements distributed, peer-to-peer (P2P) notarization of transactions submitted to the network. Examples of existing blockchain networks include the Bitcoin network, the Litecoin network, and the like. In a blockchain network, the transactions and their payloads are intentionally left open to the public, and the notarization of the transactions (manifested in the form of a distributed ledger known as a "blockchain") cannot be forged without having control over the majority of the computational power in the network. As a result, blockchain networks are inherently immune to eavesdropping attacks and are highly secure against masquerade attacks. A more detailed discussion of blockchain networks and their operation is provided below.

According to one set of embodiments, a sender application running on a sender computer system at a first site can transmit, using a blockchain network, a token to a receiver application running on a receiver computer system at a second site that is remote from the first site. The token can include, among other things, (1) metadata regarding a data set to be transferred from the sender computer system to the receiver computer system, and (2) information regarding a cloud storage service (e.g., a service address and login credentials) where the data set will be temporarily stored during the transfer process. The data set may be a portion of a larger data payload that will be transferred in separate rounds from the sender computer system to the receiver computer system, or may represent the entirety of the data payload to be transferred. In response to receiving the token, the receiver application can extract (1) and (2) from the token and can transmit, via the blockchain network, an acknowledgement (ACK) token back to the sender application.

Subsequent to this token exchange, the sender application can begin uploading, via a public network, the data set to the cloud storage service specified in the token. The receiver application can also begin downloading, via the public network, the uploaded data set from that same cloud storage service. The upload and download operations can continue until a complete copy of the data set has been downloaded by the receiver application.

Finally, once the receiver application has received the data set, the foregoing token exchange and cloud upload/download phases can be repeated for further rounds/data sets as needed until the entirety of the data payload is transferred from the sender computer system to the receiver computer system.

With the high-level HBDT approach described above, a number of benefits can be realized. First, since this approach can be implemented using the public network infrastructure between the sender and receiver computer systems, it avoids the high costs of leasing or installing private lines.

Second, in comparison to existing data transfer methods over public networks, HBDT can provide greater security and/or immunity against various types of network attacks (e.g., eavesdropping and masquerade attacks). This is due to the inherent properties of the blockchain network, which is leveraged by HBDT to exchange the tokens that direct the data transfer process.

Third, by limiting usage of the blockchain network to exchanging tokens (which are relatively small in size) and by relying on the cloud storage service(s) for transferring the actual data payload, HBDT can minimize costs associated with using the blockchain network. Note that many public blockchain networks charge a fee per transaction and the amount of data that can be included in a given transaction is limited to a certain number of bytes. In the Bitcoin network, this results in transaction fees of approximately $3 per megabyte of data. Thus, by reducing the amount of data transferred over the blockchain network, the cost efficiency of HBDT is superior to alternative implementations that may rely solely on the blockchain network for data transfer.

Fourth, HBDT can be easily enhanced in various ways to optimize use of the bandwidth in the public network, thereby improving data throughput performance and scalability. For example, in one embodiment, HBDT can run the cloud upload/download operations across multiple cloud storage service addresses in parallel. In another embodiment, HBDT can interleave execution of the token exchange and upload/download phases. In yet another embodiment, HBDT can selectively choose which cloud storage service address(es) will be used for upload/download based on their measured rates of throughput to the sender and/or receiver computer systems. These features can allow for consistently high data throughput and scalability to support very large data transfers.

2. System Environment

Figure 1:
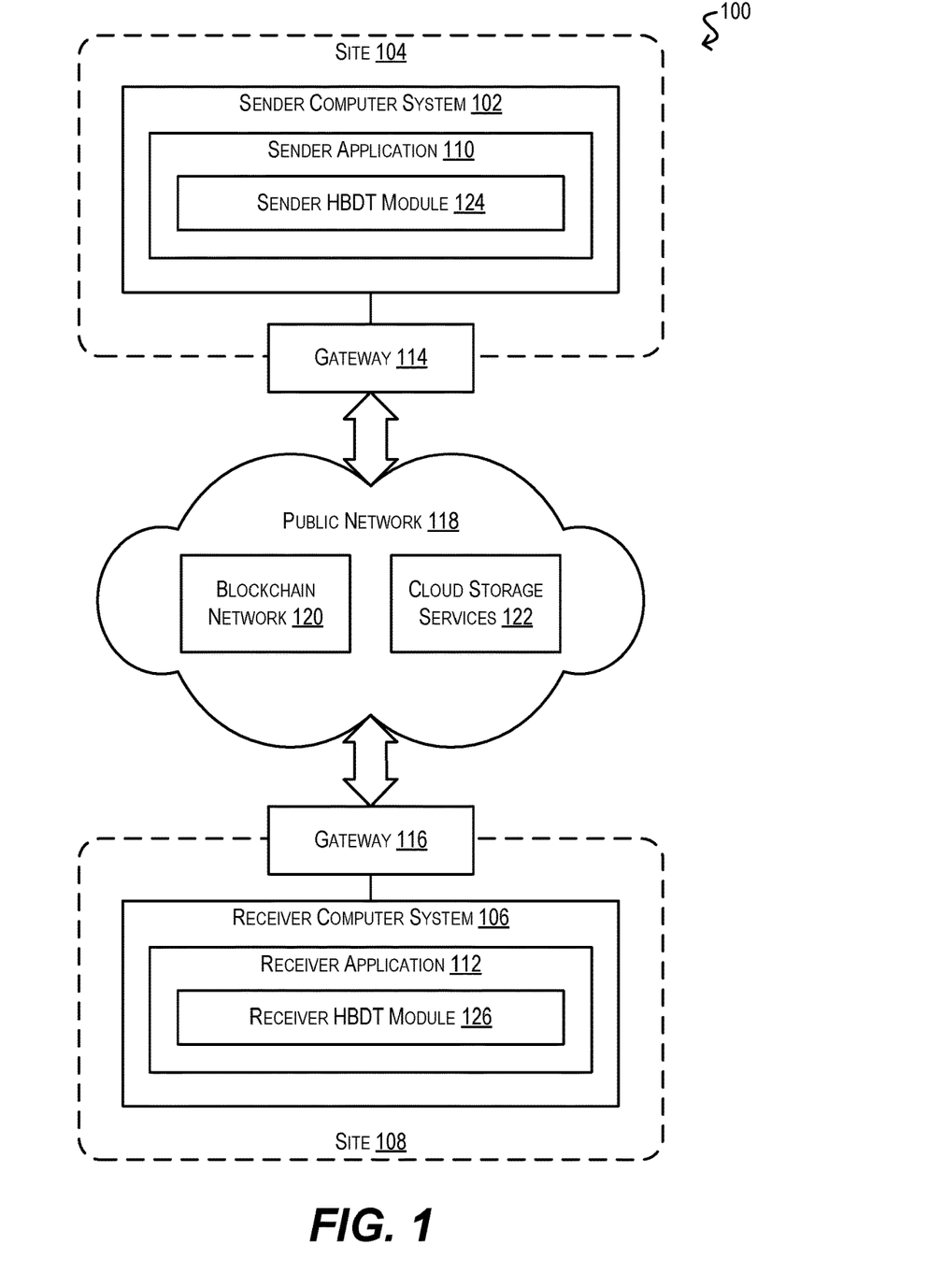
FIG. 1 depicts a system environment that supports hybrid blockchain-based data transfer (HBDT) according to an embodiment.

FIG. 1 depicts a system environment 100 that supports HBDT according to an embodiment. As shown, system environment 100 includes a sender computer system 102 located at a first site 104 and a receiver computer system 106 located at a second site 108. Sender computer system 102 runs a sender application 110 that is configured to transfer data (in the form of, e.g., one or more files) to a corresponding receiver application 112 running on receiver computer system 106. In a particular embodiment, sender application 110 may transfer relatively large volumes of data (e.g., on the order of gigabytes, terabytes, or more) to receiver application 112 on a regular or irregular basis. By way of example, sender application 110 may be a VM or storage replication agent that transfers large volumes of VM and/or virtual disk data to receiver application 112 for disaster recovery purposes. In other embodiments, sender application 110 may be configured to transfer any other size and/or type of data payload.

Sites 104 and 108 are connected via respective gateways 114 and 116 to a common public network 118 (e.g., a public wide area network (WAN) such as the Internet). In one embodiment, sites 104 and 108 may represent geographically separate offices or datacenters in a corporate cloud/ROBO environment. Public network 118 enables each site to access a blockchain network 120 and one or more cloud storage services 122.

2.A Blockchain Network

Blockchain network 120 is a computer network that implements distributed, P2P notarization of data that is submitted, in the form of transactions, to the network. The notarized transactions are recorded in a ledger known as a blockchain and a copy of the blockchain is maintained by each node of the network. In a cryptocurrency context, each transaction typically corresponds to a transfer of cryptocurrency (e.g., bitcoins) from one party to another. In a more general data transfer context (as described herein), each transaction can correspond to a transfer of any type of data between parties.

In practice, when a first party A wishes to transfer data to a second party B using blockchain network 120, party A can submit a transaction to network 120 that identifies the data to be transferred and a "blockchain address" of party B. This blockchain address is an alphanumeric identifier that is known to (and typically generated by) party B so that he/she can retrieve the data once it is notarized and recorded in the blockchain. The submission of the transaction causes the transaction to be openly broadcast to every node of blockchain network 120.

Each node can then attempt, in parallel, to notarize the transaction by creating a new block in the blockchain that incorporates the transaction (and any other transactions received within the same time period). The process of creating this new block involves taking a hash of the previous block in the blockchain and using this in combination with a hash of the current in-progress block to compute a "proof-of-work" code that satisfies a pre-specified condition. The pre-specified condition is typically designed to require a substantial amount of compute time/processing in order to generate the proof-of-work code.

Once a node has found a valid proof-of-work code for the block, the node can broadcast the code and the block to other nodes in blockchain network 120. Each receiving node can verify the proof-of-work code and, if valid, can express its acceptance of the block by adding the block to its local copy of the blockchain. The nodes can then proceed to work on the proof-of-work code for the next block (which incorporates the hash of the accepted block) in order to notarize and add new transactions. Party B can subsequently "receive" the data submitted by party A by accessing the blockchain using his/her blockchain address (which is encoded in the newly added block) and retrieving the transaction data associated with that address.

There are two consequences that arise out of the foregoing process. First, since all transactions are transmitted openly between nodes of blockchain network 120, eavesdropping or sniffing attacks to capture transaction data are rendered meaningless.

Second, as long as the majority of the computational power in blockchain network 120 is controlled by non-malicious nodes, the longest blockchain in the network is guaranteed to be valid (i.e., correctly record all of the transactions submitted to the network, without forgeries or modifications). This is because each node will only add a new block to the blockchain when the computed proof-of-work code for the new block is verified as being correct, and the proof-of-work code is dependent on the content of that block as well as the content of previous blocks in the blockchain. These factors mean that, without controlling more than 50% of the computational power in the network, a group of malicious nodes cannot generate a forged blockchain that is longer than the blockchain created by the non-malicious nodes, since the non-malicious nodes will necessarily outpace the malicious nodes.

In certain embodiments, blockchain network 120 can be a "public" blockchain network, such as the Bitcoin or Litecoin network, which means that network 120 is made open for use by the general public. In these embodiments, a per-transaction processing fee will typically be imposed on users of the network (e.g., 0.001 BTC in the Bitcoin network).

In other embodiments, blockchain network 120 can be a "private" (or "federated") blockchain network, which means that network 120 is operated by one or more private entities and is intended for sole use by those entities. In the case of a private blockchain network, the nodes of the network may be implemented using machines that are pre-identified and located on premise at one or more of the private entity's computing sites.

2.B Cloud Storage Services

Cloud storage services 122 represent a collection of services that enable users to upload data to, and download data from, online storage resources via public network 118. For each cloud storage service, a user of that service (e.g., an individual or an entity such as an organization or corporation) is typically provided a cloud storage service address and login credentials. The cloud storage service address may be, e.g., a web address and the login credentials may be, e.g., a username and password. The user can then use the address and login credentials to access his/her storage allocation on the service.

Like blockchain network 120, cloud storage services 122 can be public or private. Examples of existing public cloud storage services include Amazon Secure Storage Service (S3), Google Drive, Dropbox, Microsoft OneDrive, and others.

2.C HBDT Modules

As discussed in the Background section, conventional techniques for performing data transfers between senders and receivers over a public network generally suffer from security vulnerabilities and/or poor data throughput and scalability. An alternative option is to install/lease a private line between the sender and receiver sites, but in many cases this option is cost-prohibitive (and may also face scalability problems).

To address these and other similar issues, sender computer system 102 and receiver computer system 106 of FIG. 1 each includes a novel sender/receiver HBDT module 124/126. Although HBDT modules 124 and 126 are shown as being integrated into applications 110 and 112, these modules may also be implemented as standalone components. Generally speaking, HBDT modules 124 and 126 can leverage blockchain network 120 (via, e.g., interoperation with one or more blockchain clients, not shown) to exchange tokens between computer systems 102 and 106 that encode parameters for a data transfer. HBDT modules 124 and 126 can then use cloud storage services 122 to carry out the actual movement of data between computer systems 102 and 106, based on the tokens exchanged over blockchain network 120. With this approach, HBDT modules 124 and 126 can enable data transfers over public network 118 in a manner that is more secure, scalable, and cost efficient than existing methods. The detailed design and operation of HBDT modules 124 and 126 are described in the sections that follow.

3. High-Level HBDT Workflow

Figure 2:
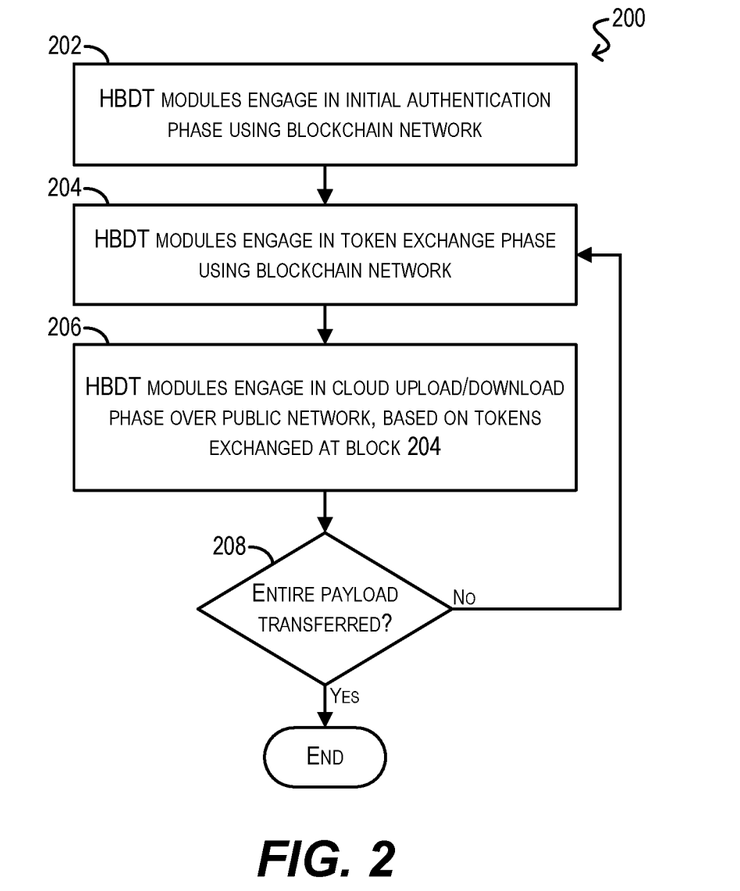
FIG. 2 depicts a high-level HBDT workflow according to an embodiment.

FIG. 2 depicts a high-level workflow 200 that identifies the major phases that may be performed by HBDT modules 124 and 126 for carrying out a hybrid blockchain-based data transfer between computer systems 102 and 106 of FIG. 1 according to an embodiment.

Starting with block 202, sender HBDT module 124 and receiver HBDT module 126 can engage in an initial authentication phase using blockchain network 120. This initial authentication phase has two purposes: (1) to enable computer systems 102 and 106 to verify their respective identities, and (2) to enable HBDT modules 124 and 126 to exchange information (e.g., initial blockchain addresses and an initial "masterkey") that allows these modules to communicate with each other in subsequent phases using blockchain network 120 (explained in Sections 4 and 5 below).

In a particular embodiment, the initial authentication phase of block 202 can be implemented using a PKI-based handshake that is similar to the initial handshake used to establish SSL/TLS connections. In other embodiments, this phase can be implemented using any other communication sequence that accomplishes purposes (1) and (2) above.

At block 204, sender HBDT module 124 and receiver HBDT module 126 can engage in a token exchange phase using blockchain network 120. The purpose of the token exchange phase is to communicate parameters between HBDT modules 124 and 126 (in the form of encrypted messages referred to as tokens) that enable these modules to transfer a data set from sender computer system 102 to receiver computer system 106 via cloud storage services 122. For example, these parameters can include metadata regarding the data set to be transferred and one or more addresses of cloud storage services 122 (and associated login credentials) where the data set will be temporarily stored during the transfer process.

At block 206, sender HBDT module 124 and receiver HBDT module 126 can engage in a cloud upload/download phase via public network 118, based on the tokens received during the token exchange. In particular, sender HBDT module 124 can upload, over public network 118, the data set to the cloud storage service address(es) included in the token sent to receiver HBDT module 126, and receiver HBDT module 126 can download, over public network 118, the uploaded data set from those cloud storage service address(es). This phase can continue until receiver HBDT module 126 has downloaded a complete copy of the data set.

Finally, at block 208, sender HBDT module 124 and/or receiver HBDT module 126 can check whether the entirety of the data payload to be transmitted between computer systems 102 and 106 has been transferred. This check is appropriate in embodiments where the data payload may be split into multiple data sets, and where a single data set is transferred in a given round comprising block 204 (the token exchange phase) and block 206 (the cloud upload/download phase). If the entirety of the data payload has been transferred at block 208, workflow 200 can end. Otherwise, the workflow can return to block 204 in order to repeat the token exchange and upload/download phases for additional rounds/data sets, and this can continue until all data sets of the payload have been transmitted.

It should be noted that, since HBDT modules 124 and 126 rely on blockchain network 120 for exchanging information during the initial authentication and token exchange phases, these phases benefit from the secure properties of blockchain network 120 (e.g., immunity/resistance to eavesdropping and masquerade attacks). Further, since HBDT modules 124 and 126 rely on public cloud services 122 (rather than blockchain network 120) for executing the actual transfer of bulk data between computer systems 102 and 106 during the cloud upload/download phase, the costs associated with using blockchain network 120 (in cases where network 120 charges a per-transaction fee) can be kept relatively low.

In addition to the foregoing advantages, in certain embodiments HBDT modules 124 and 126 can implement enhancements that allow modules 124 and 126 to make optimal use of the bandwidth in public network 118 when executing workflow 200; these enhancements are discussed in Section 7 below.

4. Initial Authentication

Figure 3:
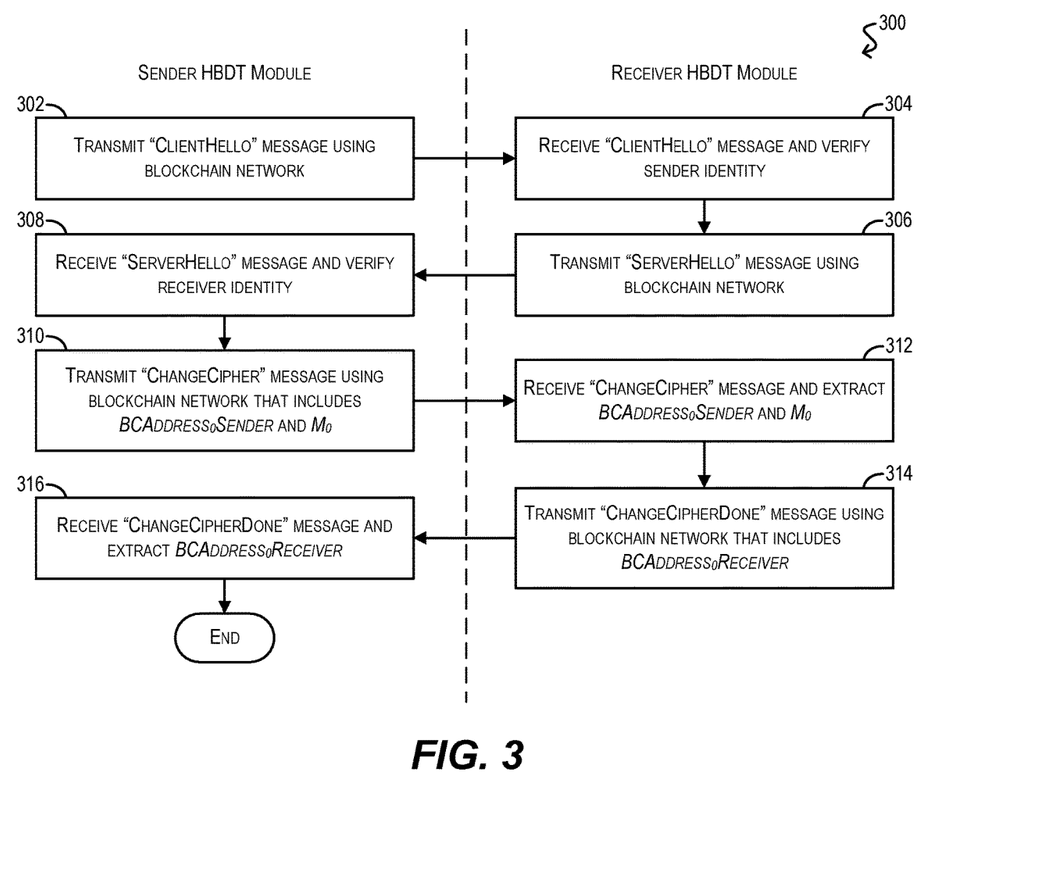
FIG. 3 depicts a workflow of the initial authentication phase of FIG. 2 according to an embodiment.

FIG. 3 depicts a workflow 300 that provides additional details regarding the steps that may be executed by HBDT modules 124 and 126 during the initial authentication phase of workflow 200 according to an embodiment.

At block 302, sender HBDT module 124 can transmit, using blockchain network 120, a first message to receiver HBDT module 126 that is substantially similar to the "ClientHello" message that is sent at the start of a conventional SSL/TLS handshake. As used herein, the act of sending/transmitting a message (or any other piece of data) by a sender to a receiver "using a blockchain network" comprises submitting, by the sender, a transaction to the blockchain network that (1) includes the message/data as the transaction's payload and (2) is addressed to a blockchain address of the receiver. Thus, the processing of block 302 can involve submitting, by HBDT module 124 (via interoperation with a blockchain client), a transaction to blockchain network 120 that includes the "ClientHello" message as the transaction's payload and is addressed to a blockchain address associated with receiver application 112 or receiver computer system 106. In a particular embodiment, the transaction can be addressed to a "private" blockchain address of receiver application 112/receiver computer system 106 (i.e., a blockchain address that is only known to the address owner and other trusted parties). Further, the content of the "ClientHello" message included in the transaction payload can comprise a PKI public key and an SSL/TLS certificate associated with sender application 110 or sender computer system 102.

At block 304, receiver HBDT module 126 can receive, using blockchain network 120, the first message sent by sender HBDT module 124. As used herein, the act of receiving a message (or any other piece of data) by a receiver from a sender "using a blockchain network" comprises retrieving, by the receiver, transaction data from the network's blockchain that is addressed to a particular blockchain address of the receiver. With respect to block 304, this can involve retrieving, by receiver HBDT module 126 (via interoperation with a blockchain client), the transaction (i.e., first message) from network 102's blockchain that is addressed to the private blockchain address of receiver application 112/receiver computer system 106 noted above. Upon receiving this first message, receiver HBDT module 126 can verify the identity of sender application 110/sender computer system 102 based on the included public key and SSL/TLS certificate.

Receiver HBDT module 126 can then transmit, using blockchain network 120, a second message to sender HBDT module 126 that is substantially similar to the "ServerHello" message that is sent in an SSL/TLS handshake (block 306). This second message (which can be addressed to a private blockchain address of sender application 110/receiver computer system 102) can include a PKI public key and an SSL/TLS certificate associated with receiver application 112 or receiver computer system 106.

At block 308, sender HBDT module 124 can receive the second message using blockchain network 120 and can verify the identity of receiver application 112/receiver computer system 106 based on the included public key and SSL/TLS certificate. Sender HBDT module 124 can subsequently send a third message to receiver HBDT module 126 using blockchain network 120 that is similar to the "ChangeCipher" message that is sent in an SSL/TLS handshake (block 310). However, unlike a conventional SSL/TLS "ChangeCipher" message, this third message can be modified to include (e.g., piggyback) (1) an initial public blockchain address of sender application 110/sender computer system 102 (referred to as $BCAddress_0Sender$), and (2) an initial masterkey (referred to as $M_0$). As described in the next section, receiver HBDT module 126 can use $BCAddress_0Sender$ and $M_0$ to carry out an initial round of the token exchange phase.

At blocks 312 and 314, receiver HBDT module 126 can receive the third message using blockchain network 120, extract $BCAddress_0Sender$ and $M_0$ from the message, and transmit a fourth message to sender HBDT module 124. This fourth message can be similar to the "ChangeCipherDone" message that is sent in an SSL/TLS handshake, but can be modified to include an initial public blockchain address of receiver application 112/receiver computer system 106 (referred to as $BCAddress_0Receiver$). Like receiver HBDT module 126, sender HBDT module 124 can use this information to carry out an initial round of the token exchange phase.

Finally, at block 316, sender HBDT module 124 can receive the fourth message using blockchain network 120, extract $BCAddress_0Receiver$, and end the user authentication workflow.

5. Token Exchange

Figure 4:
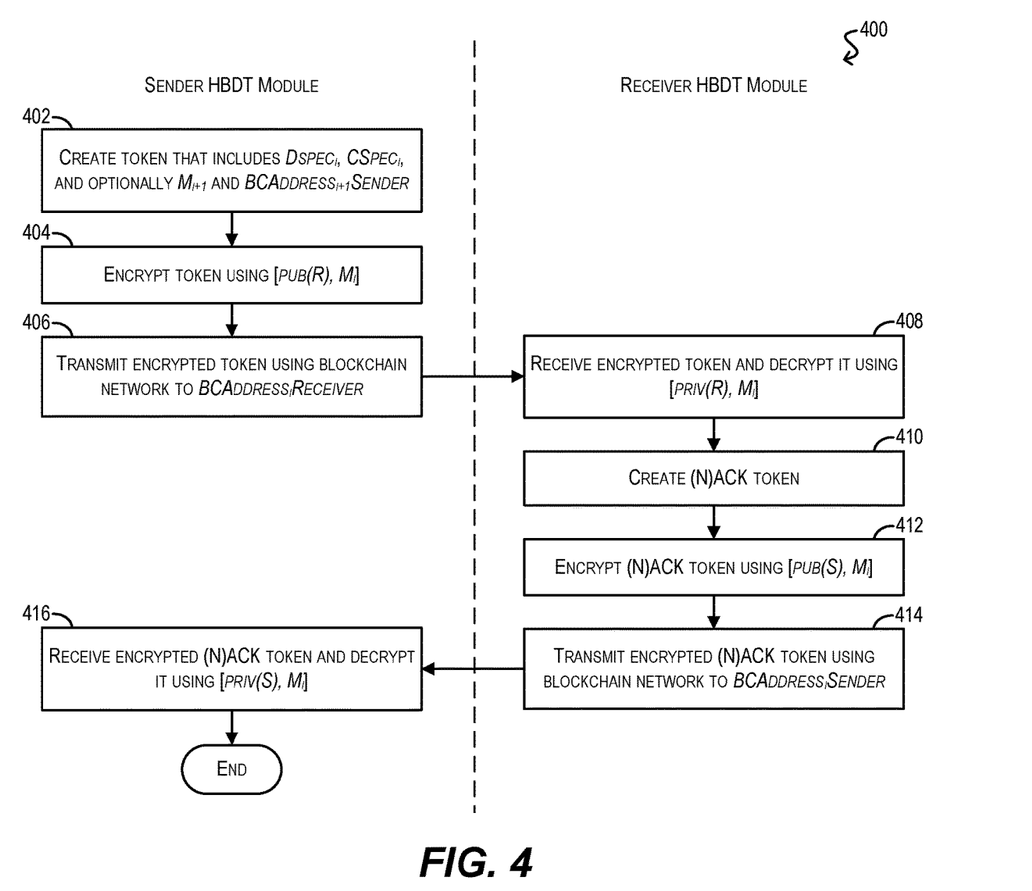
FIG. 4 depicts a workflow of the token exchange phase of FIG. 2 according to an embodiment.

FIG. 4 depicts a workflow 400 that provides additional details regarding the steps that may be executed by HBDT modules 124 and 126 during the token exchange phase of workflow 200 according to an embodiment. Workflow 400 assumes that initial authentication workflow 300 of FIG. 3 has been completed. In addition, workflow 400 assumes that (1) the data transfer between computer systems 102 and 106 is occurring over one or more rounds r, and (2) the current round is round i, where i ranges from 0 (the initial round) to r−1.

At block 402, sender HBDT module 124 can create a token that includes metadata regarding the data set to be transferred in current round i (referred to as $DSpec_i$) and information regarding a cloud storage service where the data set will be temporarily stored (referred to as $CSpec_i$). $DSpec_i$ can specify, e.g., the data set size, the total number of rounds r, and potentially other data-related parameters. $CSpec_i$ can specify, e.g., a URL or other address of the cloud storage service and associated login credentials (e.g., username and password).

In cases where current round i is not the last round r−1, the token can also include a new masterkey (i.e., $M_{i+1}$) and a new public blockchain address of sender application 110/sender computer system 102 (i.e., $BCAddress_{i+1}Sender$) to be used in the next round i+1.

At block 404, sender HBDT module 124 can encrypt the token created at block 402 using a combination of the public key of receiver application 112/receiver computer system 106 (referred to as Pub(R)) and the current round masterkey $M_i$. Sender HBDT module 124 can then transmit, using blockchain network 120, the encrypted token to receiver HBDT module 126 (block 406), where the transmission is addressed to the current round public blockchain address of receiver application 112/receiver computer system 106 (i.e., BCAddress$_i$Receiver). Note that, if current round i is the initial round 0, sender BHDT module 124 can use $M_0$ and BCAddress$_0$Receiver (received during the initial authentication phase) for the processing at blocks 404 and 406.

At block 408, receiver HBDT module 126 can receive the encrypted token using blockchain network 120 and can decrypt it using a combination of the private key of receiver application 112/receiver computer system 106 (referred to as Priv(R)) and current round masterkey $M_i$. As part of this step, receiver HBDT module 126 can extract the contents of the token (e.g., data set metadata, cloud storage service information, optional next round masterkey and blockchain address, etc.). If the decryption at block 408 is successful, receiver HBDT module 126 can create an acknowledgement (ACK) token indicating that the original token has been received; on the other hand, if the decryption is unsuccessful, receiver HBDT module 126 can create a non-acknowledgement (NACK) token indicating that the original token was defective (block 410).

Receiver HBDT module 126 can then encrypt the (N)ACK token using a combination of the public key of sender application 110/sender computer system 102 (referred to as Pub(S)) and $M_i$ (block 412), and transmit, using blockchain network 120, the encrypted (N)ACK token to sender HBDT module 124 via the sender's current round public blockchain address (i.e., BCAddress$_i$Sender) (block 414). As in blocks 404 and 406, if current round i is the initial round 0, receiver BHDT module 126 can use $M_0$ and BCAddress$_0$Sender (received during the initial authentication phase) for the processing at blocks 412 and 414.

Finally, at block 416, sender HBDT module 124 can receive the encrypted (N)ACK token using blockchain network 120, decrypt it using a combination of the private key of sender application 110/sender computer system 102 (referred to as Priv(S)) and $M_i$, and assuming the token is ACK, end the token exchange phase for current round i. Although not shown in FIG. 4, if the token is an NACK (or if no token is received from receiver HBDT module 126 within a preconfigured timeout interval), sender HBDT module 124 can choose to resend the original token or terminate the data transfer.

6. Cloud Upload/Download

Figure 5:
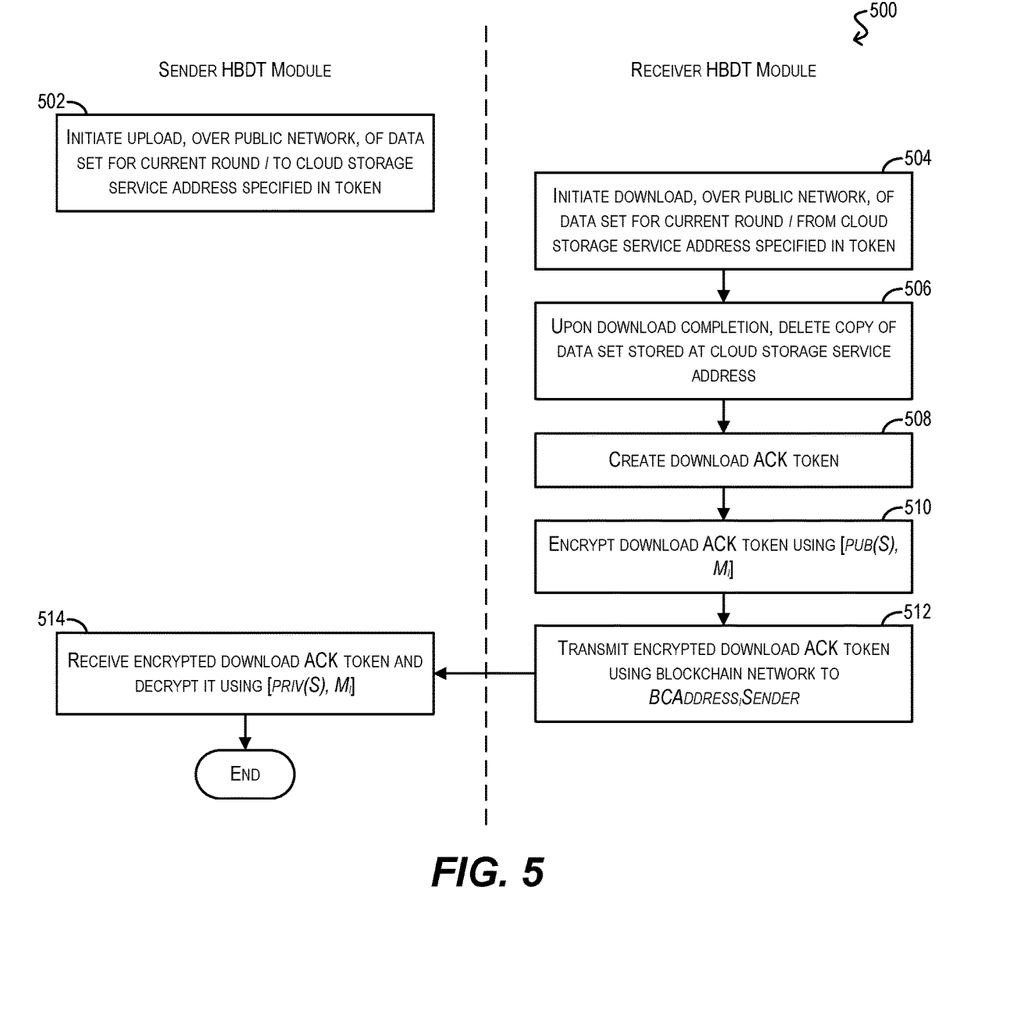
FIG. 5 depicts a workflow of the cloud upload/download phase of FIG. 2 according to an embodiment.

FIG. 5 depicts a workflow 500 that provides additional details regarding the steps that may be executed by HBDT modules 124 and 126 during the cloud upload/download phase of workflow 200 according to an embodiment. Workflow 500 assumes that token exchange workflow 400 of FIG. 4 has been completed for current round i.

At block 502, sender HBDT module 124 can initiate an upload, via public network 118, of the data set for current round i to the cloud storage service address specified in the current round token exchange. At substantially the same time (or soon thereafter), receiver HBDT module 126 can initiate a download, via public network 118, of the data set from that cloud storage service address (block 504). The processing at block 504 can comprise polling, by receiver HBDT module 126, the cloud storage service to determine when the upload has begun, and then initiating the download task in response to that determination. Alternatively, receiver HBDT module 126 may receive a push message from the cloud storage service indicating that the upload has started. Recall that receiver HBDT module 126 learns the cloud storage service address and its associated access information (e.g., login credentials such as username/password) from the token received from sender HBDT module 124.

Once receiver HBDT module 126 has finished its download, module 126 can delete the copy of the data set stored at the cloud storage service address (block 506). Receiver HBDT module 126 can then create a "download ACK" token indicating that the download has completed successfully (block 508), encrypt the download ACK token using a combination of Pub(S) and $M_i$ (block 510), and transmit the encrypted download ACK token, using blockchain network 120, to sender HBDT module 124 (i.e., to BCAddress$_i$Sender) (block 512).

Finally, at block 512, sender HBDT module 124 can receive the encrypted ACK token, decrypt it using a combination of Priv(S) and $M_i$, and end the cloud upload/download phase for current round i. At the conclusion of this phase, the token exchange and cloud upload/download phases can be repeated for additional rounds as needed (per workflow 200 of FIG. 2) until the entirety of the data payload to be sent from sender computer system 102 to receiver computer system 106 is transferred.

7. Optimizing Usage of Public Network Bandwidth

As mentioned previously, in certain embodiments the HBDT workflows described herein can be enhanced to optimize usage of the bandwidth in public network 118 during the token exchange and/or cloud upload/download phases. For example, in one set of embodiments, sender HBDT module 124 can split the data set to be transferred in a given round into multiple (e.g., n) subsets, and can specify n different cloud storage service addresses in the token sent to receiver HBDT module 126. Then, during the cloud upload/download phase, HBDT modules 124 and 126 can perform their respective upload and download operations in parallel (e.g., using multi-threading) across the n cloud storage service addresses, such that one data subset is uploaded to/downloaded from each address. This can improve data throughout efficiency in scenarios where the routes to each cloud storage service address over public network 118 are different, and thus are not constrained by a common bandwidth cap.

In another set of embodiments, sender HBDT module 124 can selectively choose which cloud storage service address(es) to use for the data transfer in each round based on the amount of available public network bandwidth between sender HBDT module 124 (and/or receiver HBDT module 126) and those address(es). For instance, at the start of the token exchange phase, sender HBDT module 124 can measure a rate of throughput over public network 118 between module 124 and each of a list of candidate cloud storage service addresses. Sender HBDT module 124 can then choose the candidate cloud storage service address with the highest measured network throughput (or the n addresses with the n highest throughputs) for inclusion in the token sent to receiver HBDT module 126. In this way, sender HBDT module 124 can avoid using a cloud storage service that is exhibiting poor throughput performance at the time of the data transfer.

Figure 6:
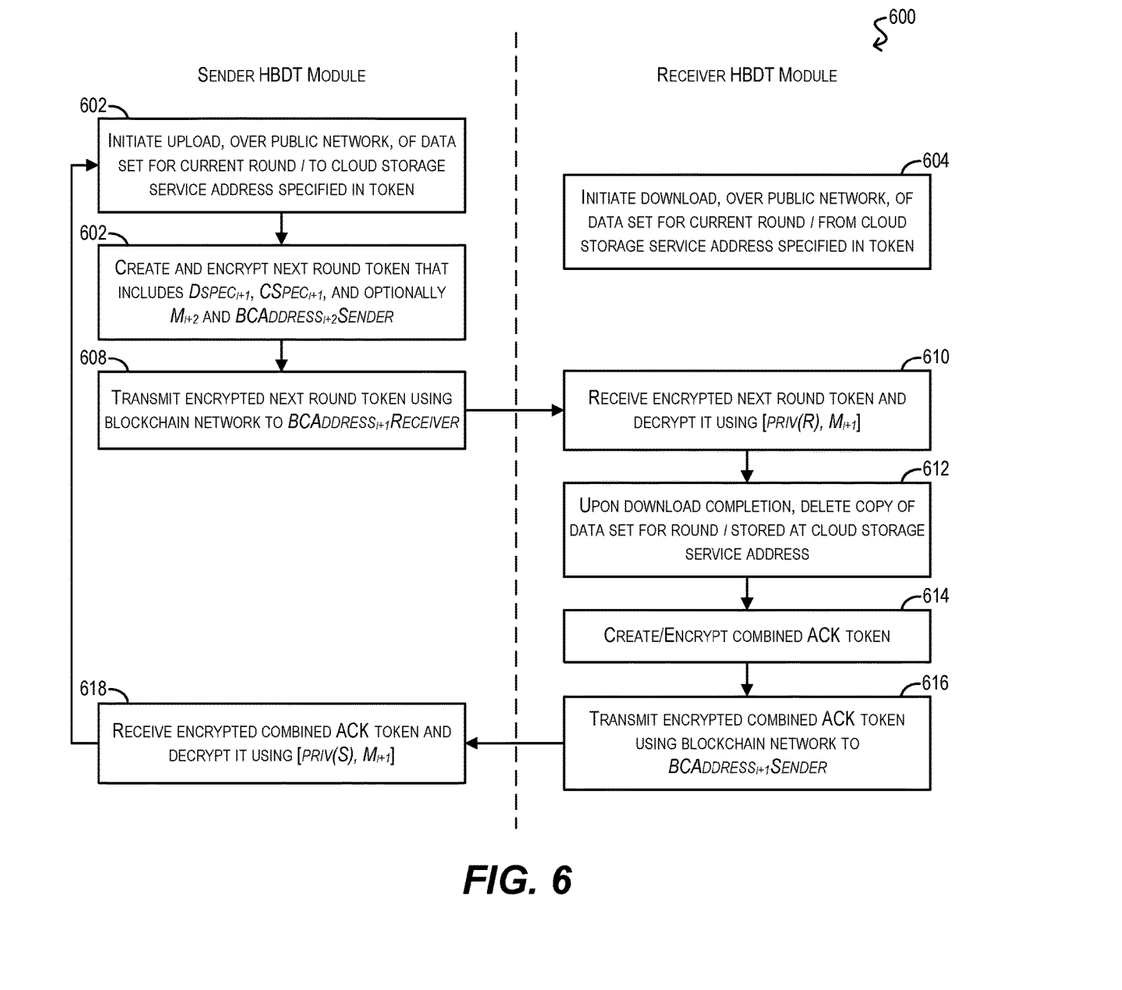
FIG. 6 depicts a workflow that interleaves aspects of FIGS. 4 and 5 according to an embodiment.

In yet another set of embodiments, HBDT modules 124 and 126 can interleave the execution of the token exchange and cloud upload/download phases such that, e.g., sender HBDT module 124 can begin the next round of token exchange before receiver HBDT module 126 has finished downloading the data set from the previous round. This enhancement can effectively use blockchain network 120 and public network 118 in parallel, reducing the total time for completing the data transfer process. FIG. 6 depicts a workflow 600 that illustrates how this interleaving can be implemented according to one embodiment. Workflow 600 effectively replaces workflow 500 of FIG. 5 in this embodiment, and assumes that token exchange workflow 400 of FIG. 4 has been executed once for the initial round of data transfer.

Blocks 602 and 604 of workflow 600 are substantially similar to blocks 502 and 504 of workflow 500; in these blocks, sender HBDT module 124 can initiate an upload, via public network 118, of the data set for current round i to the cloud storage service address specified in the current round token exchange, and receiver HBDT module 126 can initiate a download, via public network 118, of the data set from that cloud storage service address.

At blocks 606 and 608, sender HBDT module 124 can create/encrypt a "next round" token for the next round i+1 and can transmit this next round token, using blockchain network 120, to receiver HBDT module 126. In response, receiver HBDT module 126 can receive and decrypt the next round token using a combination of Priv(R) and $M_{i+1}$ (block 610). Note that, unlike workflows 400 and 500, this new token transmission occurs before receiver HBDT module 126 has completed downloading the data set for current round i.

Once receiver HBDT module 126 has finished its download, module 126 can delete the copy of the data set for current round i stored at the cloud storage service address (block 612). Receiver HBDT module 126 can then create/encrypt a "combined" ACK token that serves as both: (1) a reply to the new token sent at block 608, and (2) an indication that the current round download is complete (block 614). For example, this combined ACK token can include a new public blockchain address of receiver application 112/receiver computer system 106 (i.e., $BCAddress_{i+1}Receiver$), like the ACK token created at block 408 of workflow 400, as well as download acknowledgement indicator or message.

At block 616, receiver HBDT module 126 can transmit the combined ACK token, using blockchain network 120, to sender HBDT module 124 (i.e., to $BCAddress_i Sender$). In response, sender HBDT module 124 can receive the combined ACK token and decrypt it using a combination of Priv(S) and $M_{i+1}$ (block 618). Finally, workflow 600 can return to block 602 and so that sender HBDT module 124 can upload the data for round i+1 (which is now the current round), and the entire workflow can repeat for further rounds as needed until the entire data payload is transferred.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for transferring data between computer systems, the method comprising:
splitting, by a first computer system at a first site, a data payload to be transferred to a second computer system at a second site into at least a first portion and a second portion;
transmitting, by the first computer system, a first token to the second computer system via a blockchain network, wherein the first token includes metadata regarding the first portion and one or more first cloud storage service addresses where the first computer system will upload and temporarily store the first portion for download by the second computer system, and wherein the first token is addressed to a first public blockchain address of the second computer system;

in response to the transmitting, receiving, by the first computer system, a first token acknowledgement message from the second computer system, the first token acknowledgement message including a second public blockchain address of the second computer system that is distinct from the first public blockchain address;

in response to receiving the first token acknowledgement message, uploading, by the first computer system, the first portion to the one or more first cloud storage service addresses;

receiving, by the first computer system, a download acknowledgement message from the second computer system indicating that the second computer system has downloaded the first portion from the one or more first cloud storage service addresses; and transmitting, by the first computer system, a second token to the second computer system via the blockchain network, wherein the second token includes metadata regarding the second portion and one or more second cloud storage service addresses where the first computer system will upload and temporarily store the second portion for download by the second computer system, and wherein the second token is addressed to the second public blockchain address of the second computer system included in the first token acknowledgement message.

2. The method of claim 1 further comprising:
receiving a second token acknowledgement message from the second computer system, the second token acknowledgement message including a third public blockchain address of the second computer system that is distinct from the first public blockchain address and the second public blockchain address.

3. The method of claim 2 further comprising:
in response to receiving the second token acknowledgement message, uploading, by the first computer system, the second portion to the one or more second cloud storage service addresses; and
receiving another download acknowledgement message from the second computer system indicating that the second computer system has downloaded the second portion from the one or more second cloud storage service addresses.

4. The method of claim 1 further comprising, prior to transmitting the first token:
measuring, for each of a plurality of candidate cloud storage service addresses, a rate of network throughput between the first computer system and the candidate cloud storage service address; and
selecting one or more of the candidate cloud storage service addresses for inclusion in the first token based on their measured network throughput.

5. The method of claim 1 wherein the second token is transmitted to the second computer system via the blockchain network in response to receiving the download acknowledgement message.

6. The method of claim 1 wherein the second token is transmitted to the second computer system via the blockchain network prior to receiving the download acknowledgement message.

7. The method of claim 1 further comprising, prior to transmitting the first token:

transmitting, to the second computer system via the blockchain network, a master key, wherein the first computer system uses the master key to encrypt the first token; and in response to transmitting the master key, receiving, from the second computer system via the blockchain network, the first public blockchain address of the second computer system.

8. A non-transitory computer readable storage medium having stored thereon program code executable by a first computer system at a first site, the program code embodying a method comprising:

splitting a data payload to be transferred to a second computer system at a second site into at least a first portion and a second portion;

transmitting a first token to the second computer system via a blockchain network, wherein the first token includes metadata regarding the first portion and one or more first cloud storage service addresses where the first computer system will upload and temporarily store the first portion for download by the second computer system, and wherein the first token is addressed to a first public blockchain address of the second computer system;

in response to the transmitting, receiving a first token acknowledgement message from the second computer system, the first token acknowledgement message including a second public blockchain address of the second computer system that is distinct from the first public blockchain address;

in response to receiving the first token acknowledgement message, uploading the first portion to the one or more first cloud storage service addresses;

receiving a download acknowledgement message from the second computer system indicating that the second computer system has downloaded the first portion from the one or more first cloud storage service addresses; and transmitting a second token to the second computer system via the blockchain network, wherein the second token includes metadata regarding the second portion and one or more second cloud storage service addresses where the first computer system will upload and temporarily store the second portion for download by the second computer system, and wherein the second token is addressed to the second public blockchain address of the second computer system included in the first token acknowledgement message.

9. The non-transitory computer readable storage medium of claim 8 wherein the method further comprises:
receiving a second token acknowledgement message from the second computer system, the second token acknowledgement message including a third public blockchain address of the second computer system that is distinct from the first public blockchain address and the second public blockchain address.

10. The non-transitory computer readable storage medium of claim 9 wherein the method further comprises:
in response to receiving the second token acknowledgement message, uploading the second portion to the one or more second cloud storage service addresses; and
receiving another download acknowledgement message from the second computer system indicating that the second computer system has downloaded the second portion from the one or more second cloud storage service addresses.

11. The non-transitory computer readable storage medium of claim 8 wherein the method further comprises, prior to transmitting the first token:
- measuring, for each of a plurality of candidate cloud storage service addresses, a rate of network throughput between the first computer system and the candidate cloud storage service address; and
- selecting one or more of the candidate cloud storage service addresses for inclusion in the first token based on their measured network throughput.

12. The non-transitory computer readable storage medium of claim 8 wherein the second token is transmitted to the second computer system via the blockchain network in response to receiving the download acknowledgement message.

13. The non-transitory computer readable storage medium of claim 8 wherein the second token is transmitted to the second computer system via the blockchain network prior to receiving the download acknowledgement message.

14. The non-transitory computer readable storage medium of claim 8 wherein the method further comprises, prior to transmitting the first token:
- transmitting, to the second computer system via the blockchain network, a master key, wherein the first computer system uses the master key to encrypt the first token; and
- in response to transmitting the master key, receiving, from the second computer system via the blockchain network, the first public blockchain address of the second computer system.

15. A computer system comprising:
a processor; and
a non-transitory computer readable medium having stored thereon program code for transferring data to another computer system, the program code causing the processor to:
- split a data payload to be transferred to said another computer system into at least a first portion and a second portion;
- transmit a first token to said another computer system via a blockchain network, wherein the first token includes metadata regarding the first portion and one or more first cloud storage service addresses where the computer system will upload and temporarily store the first portion for download by said another computer system, and wherein the first token is addressed to a first public blockchain address of said another computer system;
- in response to the transmitting, receive a first token acknowledgement message from said another computer system, the first token acknowledgement message including a second public blockchain address of said another computer system that is distinct from the first public blockchain address;
- in response to receiving the first token acknowledgement message, upload the first portion to the one or more first cloud storage service addresses;
- receive a download acknowledgement message from said another computer system indicating that said another computer system has downloaded the first portion from the one or more first cloud storage service addresses; and
- transmit a second token to said another computer system via the blockchain network, wherein the second token includes metadata regarding the second portion and one or more second cloud storage service addresses where the computer system will upload and temporarily store the second portion for download by said another computer system, and wherein the second token is addressed to the second public blockchain address of said another computer system included in the first token acknowledgement message.

16. The computer system of claim 15 wherein the program code further causes the processor to:
- receiving a second token acknowledgement message from said another computer system, the second token acknowledgement message including a third public blockchain address of said another computer system that is distinct from the first public blockchain address and the second public blockchain address.

17. The computer system of claim 16 wherein the program code further causes the processor to:
- in response to receiving the second token acknowledgement message, upload the second portion to the one or more second cloud storage service addresses; and
- receive another download acknowledgement message from said another computer system indicating that said another computer system has downloaded the second portion from the one or more second cloud storage service addresses.

18. The computer system of claim 15 wherein the program code further causes the processor to, prior to transmitting the first token:
- measure, for each of a plurality of candidate cloud storage service addresses, a rate of network throughput between the computer system and the candidate cloud storage service address; and
- select one or more of the candidate cloud storage service addresses for inclusion in the first token based on their measured network throughput.

19. The computer system of claim 15 wherein the second token is transmitted to said another computer system via the blockchain network in response to receiving the download acknowledgement message.

20. The computer system of claim 15 wherein the second token is transmitted to said another computer system via the blockchain network prior to receiving the download acknowledgement message.

21. The computer system of claim 15 wherein the program code further causes the computer system to, prior to transmitting the first token:
- transmit, to said another computer system via the blockchain network, a master key, wherein the computer system uses the master key to encrypt the first token; and
- in response to transmitting the master key, receive, from said another computer system via the blockchain network, the first public blockchain address of said another computer system.

* * * * *